United States Patent

Irwin

[15] 3,689,124
[45] Sept. 5, 1972

[54] LINEAR MOTION ANTI-FRICTION BEARING AND METHOD OF MANUFACTURING

[72] Inventor: Arthur S. Irwin, Bemus Point, N.Y.
[73] Assignee: TRW Inc., Cleveland, Ohio
[22] Filed: Sept. 11, 1970
[21] Appl. No.: 71,523

[52] U.S. Cl. .................................................. 308/6 C
[51] Int. Cl. ..................................................F16c 19/02
[58] Field of Search ......................................308/6 C

[56] References Cited

UNITED STATES PATENTS

| | | | |
|---|---|---|---|
| 1,918,108 | 7/1933 | Jonkhoff | 308/6 C |
| 2,628,135 | 2/1953 | Magee | 308/6 C |

FOREIGN PATENTS OR APPLICATIONS

| | | | |
|---|---|---|---|
| 644,666 | 7/1962 | Canada | 308/6 C |
| 1,352,964 | 1/1964 | France | 308/6 C |

*Primary Examiner*—Martin P. Schwadron
*Assistant Examiner*—Frank Susko
*Attorney*—Hill, Sherman, Meroni, Gross & Simpson

[57] ABSTRACT

An anti-friction bearing for linear motion which has a cylindrical housing receiving a split cylindrical ball retainer, the inner diameter of the housing having a varying radius to provide ball loading and ball return paths and end portions of the split retainer being undulated to conform with the varying radius of the housing whereby the ball retainer is locked against rotational movement.

9 Claims, 12 Drawing Figures

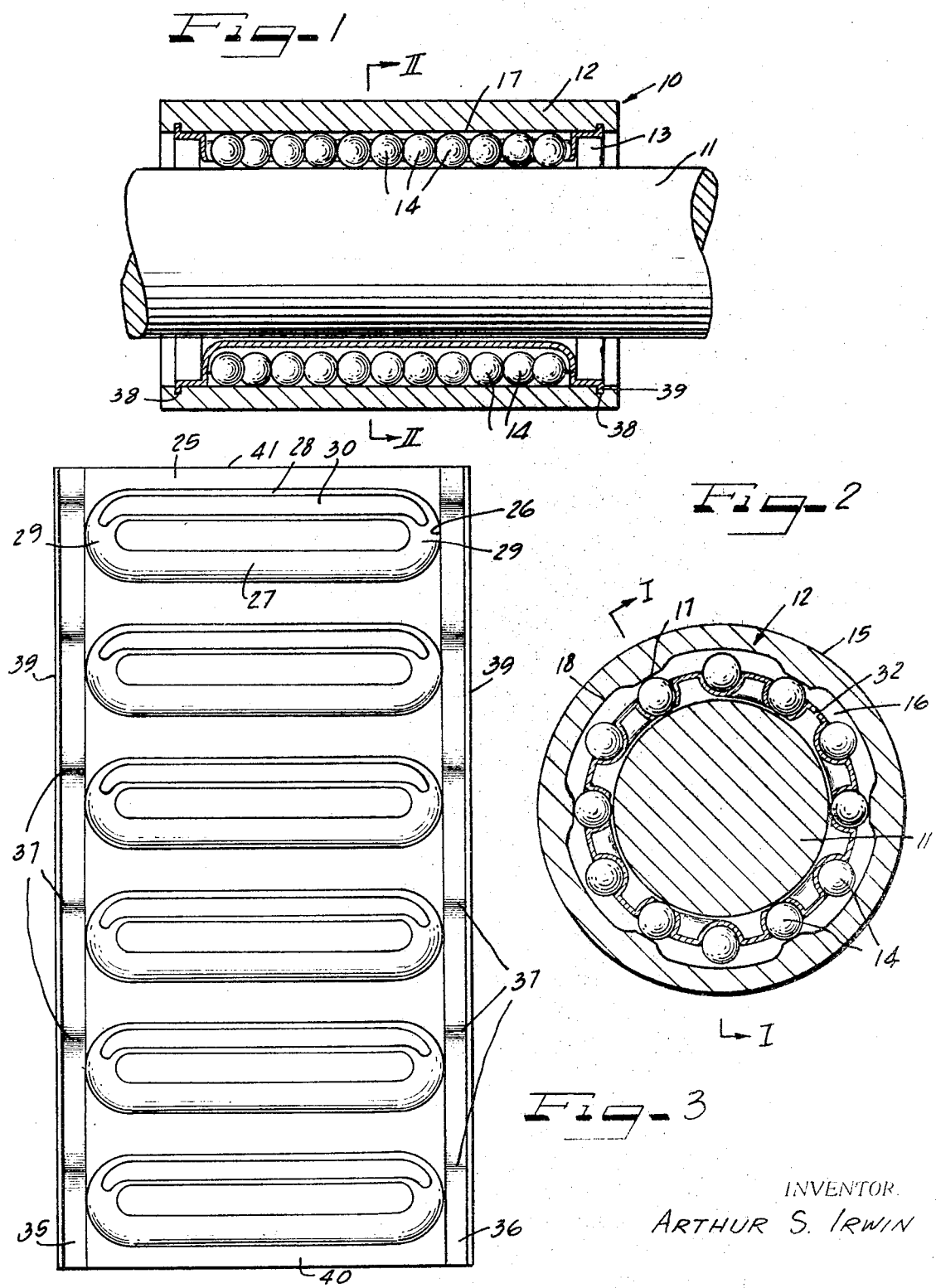

PATENTED SEP 5 1972
3,689,124
SHEET 2 OF 3
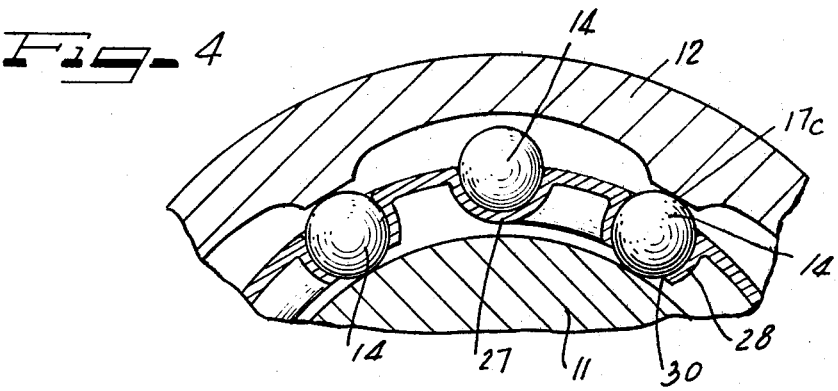
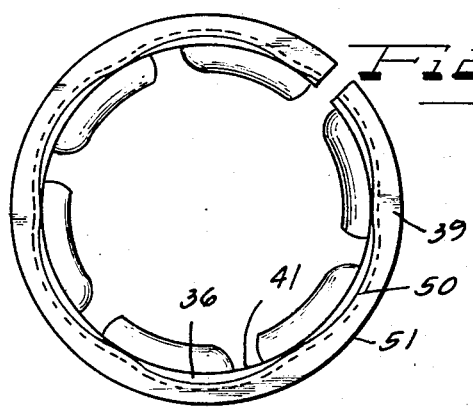
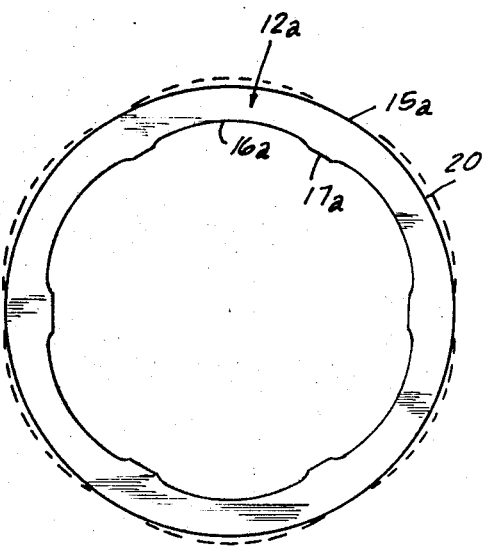
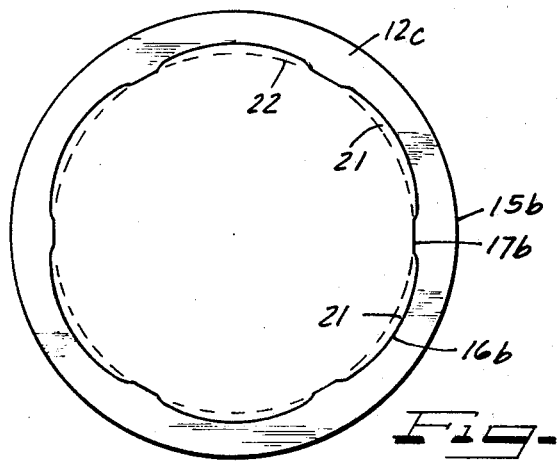
INVENTOR.
ARTHUR S. IRWIN
BY
ATTORNEYS

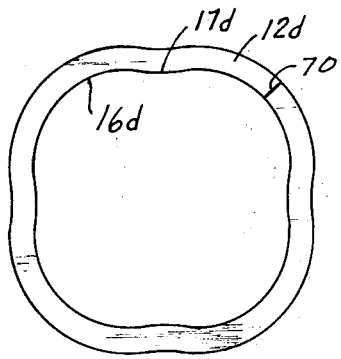
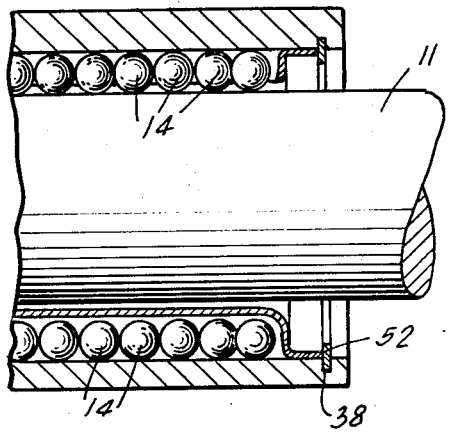
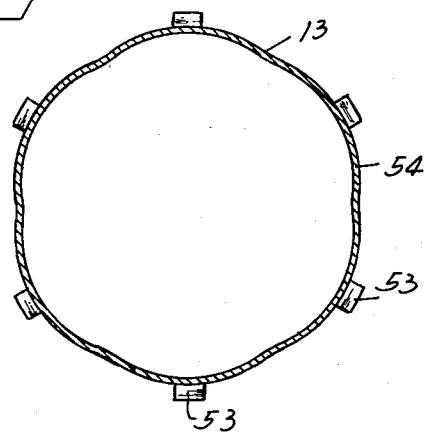
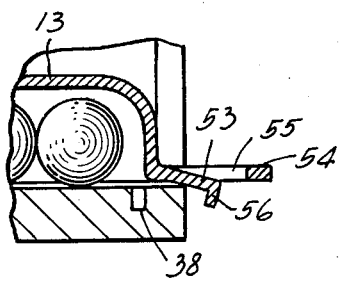
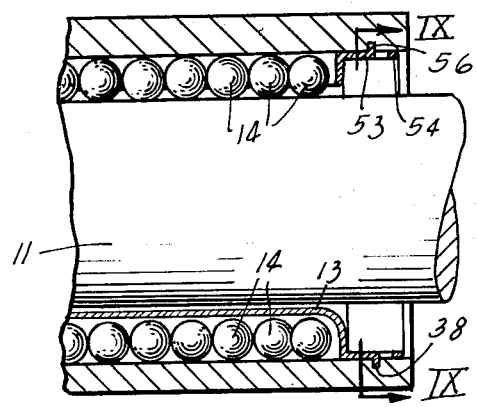
INVENTOR.
ARTHUR S. IRWIN

3,689,124

LINEAR MOTION ANTI-FRICTION BEARING AND METHOD OF MANUFACTURING

BACKGROUND OF THE INVENTION

1. Field of the Invention

This is invention relates to anti-friction bearings and more importantly to a linear motion anti-friction bearing.

2. Prior Art

Linear motion anti-friction bearings are old in the art. A popular method of manufacturing such bearings is to provide a variously configured strip of metal which acts as a ball guide and retainer. The strip is formed into an annular split retainer which is then received around a shaft with the balls entrapped between the shaft and the retainer. Such a construction is illustrated in the U. S. Pat. to J. B. Thomson, No. 2,509,749. It has also been known to provide a plurality of metal strips which are received within a cylindrical bore in a housing. (See for example the U.S. Pat. to J. B. Thomson, No. 2,503,009.) These two methods have been combined to provide a continuous strip ball retainer received in a housing. (See for example the U.S. Pat. to R. C. Magee, No. 2,628,135.)

In most such prior art linear motion bearings, the ball retainer has a plurality of longitudinal slots therethrough having a width less than the diameter of the balls. Radially outwardly from the slots is an inwardly offset radially depressed area of the housing which then contacts the balls to press them into engagement with the shaft through the longitudinal slots of the retainer. Circumferentially spaced from the slotted areas are depressions in the retainer which act as ball return paths and lie radially inwardly from portions of the housing which are not depressed, thereby giving greater radial clearance.

It has additionally been known to provide a varying thickness housing rather than one with depressed areas. (See for example the U.S. Pat. to J. B. Thomson et al., No. 3,005,665.) Where such a housing is provided, the inner wall thereof presents an undulated circumferential path. In order for the bearing to work, the retainer section must be maintained in circumferential alignment with the undulations so that the radially thickest portions of the housing overlie the slotted portions of the retainer. Further, axial movement of the retainer within the housing must be prevented in order to restrain the housing from moving off the retainer, thereby allowing the balls to drop out.

Radial and axial stability has sometime been accomplished through the use of integral end tabs which have tongues mating with grooves on the housing as in the U.S. Pat. to Ferger, No. 2,452,117, or screws extending through the housing and ball retainer as in the U.S. Pat. to J. B. Thomson, No. 2,576,269.

SUMMARY OF THE INVENTION

This invention overcomes the deficiencies in the prior art and provides the means for preventing axial movement and radial rotation of the ball retainer without the necessity of integral or attached end caps or fastening devices such as screws or lock pins which can become loose. The invention utilizes a broached or extruded housing having a varying thickness to provide a plurality of circumferentially spaced longitudinal bearing lands separated by increased radius return paths.

The radius variations extend the entire length of the housing, thereby reducing the manufacturing cost of the housing. The ball retainer is a strip of metal which is formed with a planar central section which has the ball paths formed therein. The central section is bordered on either end with a varyingly configured portion providing an undulating path and terminating in an outturned flange at the end of the retainer. When the retainer is formed into a split tubular shape, the undulations of the portions match the undulations of the varying thickness of the housing to lock the retainer against rotation while the flange is adapted to snap into a groove adjacent the axial ends of the housing to lock the retainer against axial movement. In another embodiment, the retainer may eliminate the flanges and be held in place with a snap ring or it may have spring fingers which snap into the retaining groove.

It is therefore an object of this invention to provide an improved linear motion anti-friction bearing.

It is a specific object of this invention to provide a linear motion anti-friction bearing having a housing with a varying radius inner diameter receiving a split tubular retainer having a portion thereof with a varying radius outer diameter to index with the inner diameter of the housing.

It is yet another and more specific object of this invention to provide a linear motion anti-friction bearing including a substantially tubular housing with a convoluted interior diameter providing alternate circumferentially spaced ball loading and return path longitudinal sections and a ball retainer having a substantially circumferential central portion with ball paths provided therein and marginal portions at either end of the ball paths having radial corrugations dimensioned to index with the undulations of the interior diameter of the housing to prevent rotation of the retainer in the housing.

It is another specific object of this invention to provide a linear motion anti-friction bearing having a housing with radial grooves adjacent either end thereof and a ball retainer with an out-turned flange at either end thereof dimensioned to be received within the grooves to limit axial movement.

It is yet another specific object of this invention to provide a linear motion bearing having a tubular housing with internal radial grooves adjacent either end thereof and a ball retainer received therein with spring fingers adjacent either end thereof adapted to lock in the grooves to prevent axial movement of the retainer with respect to the housing.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a longitudinal cross-sectional view of a linear motion anti-friction bearing according to this invention received on a shaft.

FIG. 2 is a transverse cross-sectional view of the antifriction bearing of FIG. 1, taken along the lines 11—11 of FIG. 1.

FIG. 3 is a plan view of the retainer strip of the anti-friction bearing of FIGS. 1 and 2 prior to rolling of the strip.

FIG. 4 is a fragmentary cross-sectional view similar to the view of FIG. 2 but on a larger scale, illustrating an extruded housing.

FIG. 5 is an end plan view of the retainer of FIG. 3 in its rolled form.

FIG. 6 is an end plan view of a housing formed as on a mandrel indicating by dotted lines material removed by circumferential grinding.

FIG. 7 is a view similar to FIG. 6 illustrating a housing formed as by broaching with dotted lines indicating material removed during formation.

FIG. 8 is a fragmentary cross-sectional view of a modified form of the invention illustrating the use of a snap ring.

FIG. 9 is an end plan view of a modified form of the retainer of this invention.

FIG. 10 is a fragmentary cross-sectional view of an end of the housing and retainer of the modified form of this invention illustrated in FIG. 9.

FIG. 11 is a fragmentary cross-sectional view of the modified form of the invention of FIGS. 9 and 10 received around a shaft.

FIG. 12 is a view similar to FIG. 7 illustrating another embodiment of the housing made from rolled sheet material.

DESCRIPTION OF THE PREFERRED EMBODIMENTS

FIG. 1 illustrates the linear motion anti-friction bearing 10 of this invention received around a shaft 11. The bearing 10 consists of a housing 12, a retainer 13 and a plurality of anti-friction bearing balls 14.

As best illustrated in FIG. 2, housing 12 is a cylindrical tube or sleeve having a constant outer diameter 15 and a varying inner diameter 16. The inner diameter 16 has a plurality of circumferentially spaced ball loading faces 17 extending the axial length of the housing 12. The ball loading faces 17 have a circumferential dimension which is substantially flat or formed along a radius. The ball loading faces 17 are circumferentially spaced by increased diameter return path areas 18. The alternating ball loading faces 17 and return path areas 18 provide for a corrugated or undulating inner diameter 16 for the housing 12. The undulations or corrugations extend the entire length of the housing.

In the case of the housing illustrated in FIG. 2, the housing 12 may be extruded to form a constant outer diameter 15 with the desired corrugated inner diameter 16. In such case, the housing may be of a non-metallic material or may be extruded metal. The use of such an extrusion reduces the amount of machining necessary to produce the housing and allows formation of the flat land 17.

FIG. 6 illustrates a second form of the housing which is formed by circumferential displacement of substantially tubular housing material around a mandrel. The mandrel (not illustrated) will have an exterior configuration corresponding to the desired interior configuration of the housing and the housing will be reduced around it as by pressing or swedging to produce an interior diameter having the bearing lands 17a and ball return spaces 16a which will correspond to the outer diameter of the mandrel. Use of the mandrel with a swedging operation will cause a cold flow of material of the housing 12a which may result in a constant outer diameter 15a. However, pressing of the housing around the mandrel, especially if done by a forge or opposed dies having internal configurations corresponding to the external configurations of the mandrel, will form a non-circular external diameter having raised portions 20. These portions can be removed by machining to provide a constant diameter outer surface where that is desired for installation reasons.

FIG. 7 illustrates a third embodiment of the housing. The housing 12b is formed initially as a cylindrical tube having a constant wall thickness and a cylindrical outer diameter 15b. Thereafter, portions 21 of the material of the original inner diameter 22 are removed as by broaching to provide the circumferentially alternating ball loading land 17b and ball return spaces 16b.

FIG. 12 illustrates a modified housing 12b which is formed from rolled sheet material with abutting ends 70. The rolled sheet material is undulated to provide alternating ball loading lands 17d and ball return spaces 16d. Where this modification is utilized, the edges may be seam-welded. However, if mounted in a specifically designed bracket or housing, the edges may be left abutted with the bracket pinching them together. In this embodiment, the outer diameter is not a continuous circle as has been described as preferred in the other embodiments. It is to be understood, of course, that these are preferred only and that in the case of different mounting configurations, they may be formed into a non-circular outer diameter as by not machining the embodiment of FIG. 6.

As illustrated in FIG. 4, where it is desired to have chordally flat ball loading lands 17c as opposed to radially flat lands, this can be accomplished either by use of a desired formed mandrel or extruding die in the case of the housings 12 and 12a, or by machining during broaching as in the case of the housing 12c. It is of course to be understood that the extra machining operation to produce the chordally flat ball loading lands may be used in connection with either the housing 12 or 12a.

The ball retainer 13 is preferably a strip of sheet metal having a width slightly shorter than the axial length of the housing. THe central section 25 of the retainer has a plurality of depressed oval ballways 26 therein with the major axis of the oval extending across the width. The oval is divided into two longitudinal stretches or ballways 27 and 28 interconnected by turnaround or return U-shaped paths 29 at either end thereof. The ballway 28 is initially formed deeper than the ballway 27 and has its bottom section 30 cut out to allow a portion of the balls in the ballway to project therethrough as is best illustrated in FIG. 4. The cut-out portion extends partially into the end paths 29 which have a sloped depth extending from the relatively shallow depth ballway 27 to the deeper depth ballway 28.

The oval ballways 26 may be formed as by punching, using dies suitably formed to provide the ballway configurations.

The number of ballways provided in the sheet correspond to the number of sets of ball loading lands 17 and ball return paths 16 in the inner diameter of the housing. The oval ballways are spaced from one another lengthwise of the sheet 13 so that when the sheet is rolled into a cylindrical formation and inserted into the housing, the open ballways 28 will be aligned with the ball loading lands 17 and the shallower closed ballways 27 will be aligned with the return path lands 16.

When the retainer 13 is rolled and inserted into the housing 12, a split end gap 32 is provided by making the retainer sleeve slightly shorter than the final diameter. This allows the retainer sleeve to be compressed to smaller than operating diameter for insertion into the housing.

Portions 35 and 36 of the retainer sheet projecting axially from the ends of the ballways 26 are provided with corrugations or undulations corresponding to the undulations of the inner diameter wall of the housing created by the circumferentially alternating ball loading lands 17 and ball return paths 16. The corrugations 37 will then index with the corrugations of the inner diameter wall of the housing to lock the ball retainer 13 therein, preventing rotation. This will ensure that the balls in the path 28 are retained in a position radially inwardly from the ball loading lands 17 and that the path 27 is retained radially inwardly from one of the ball return areas 16.

In order to prevent axial movement of the retainer 13 in the housing 12, in the embodiment illustrated in FIGS. 1 and 2, grooves 38 are provided in the inner diameter wall of the housing 12 adjacent the axial ends thereof. Marginal axial end portions 39 of the retainer are then bent so as to provide radial flanges when the retainer is rolled to its operating shape. By compressing the gap 32 until the ends 40 and 41 of the retainer 13 meet, when inserting the retainer into the housing 12, will allow the flanges 39 to clear the housing. Thereafter, allowing the retainer to expand until the undulated portions 35 and 36 are in firm contact with the inner diameter wall of the housing will allow the flanges 39 to lock into the grooves 38, thereby preventing axial movement of the retainer. Preferably, the grooves 38 are cut circular whereby they will have varying depths due to the undulations of the inner diameter of the housing.

This can be accomplished either by forming the flange with a constant inner diameter and constant outer diameter with the radial length equal to the minimal depth of the groove. Alternatively, as best illustrated in FIG. 5, the flange 39 can be formed with an undulating inner diameter 50 and a constant outer diameter 51.

Although the ball retainer 13 has been described as formed from a planar sheet rolled to a tubular configuration with a split gap, it is possible to form the retainer from a continuous tube. When so formed, the retainer will not have a split gap, but can still be formed with the undulated portions 35 and 36 at either end thereof to lock against rotation. In such a case, axial movement can be limited either by the provision of a snap ring 52 as best illustrated in FIG. 8 or by spring tabs 53 illustrated in FIGS. 9 through 11. The spring tabs 53 are cut from the end portions 54 of the retainer 13 as by punching at 55 and have out-turned flanges 56 formed at their axially outer ends. The spring tabs can then be radially compressed so that the retainer 13 can be assembled into the housing. After such assembly, the tabs 56 will snap downwardly into the retaining groove 35 to lock against axial movement while radial movement is prevented by the undulations in the axial end portions 54. It is of course to be understood that the spring fingers 53 or the snap ring 52 may be used in connection with a tubularly rolled flat retainer as illustrated in FIG. 3.

It will be understood from the above, therefore, that my invention provides a linear motion bearing having a tubular housing with an undulating interior wall providing circumferentially alternatingly spaced ball loading portions and ball return portions with a ball retainer defining oval ballways telescoped interiorly of the housing, the retainer having undulating portions adjacent either end thereof which index with the inner diameter corrugations of the housing to lock the retainer against rotation. Means such as a tongue and groove, snap ring, or spring fingers are provided and indexed with a housing groove to prevent axial movement of the retainer.

Although the teachings of my invention have herein been discussed with reference to specific theories and embodiments, it is to be understood that these are by way of illustration only and that others may wish to utilize my invention in different designs or applications.

I claim as my invention:

1. A linear motion bearing comprising a housing having an inner diameter, said inner diameter having a varying radius providing ball loading lands circumferentially separated by ball return areas, the varying radius inner diameter extending the axial length of the housing, a ball retainer received in said housing, the ball retainer having portions adjacent each axial end thereof having an outer diameter in contact with the inner diameter of the said housing, the said portions lying axially beyond ball pathways formed radially inwardly from said portions in said retainer, the said portions having varying outer diameters to mate with the varying inner diameter of the housing whereby the said retainer is locked against rotation within the said housing.

2. A linear motion ball bearing comprising: a tubular housing having a constant outer diameter and a varying inner diameter, said inner diameter defining radially innermost bearing loading lands circumferentially separated by increased radius ball return portions, said bearing loading lands having a substantially flat surface, a ball retainer in said housing, said ball retainer comprising an axially split tube having oval ballways formed therein circumferentially spaced from one another, the major axis of said oval ballways extending axially of the retainer, said ballways having loaded ball paths and unloaded ball paths, said loaded ball paths radially aligned with the said ball loading lands, the said unloaded ball paths radially aligned with the said ball return passageways, axially separated portions extending axially beyond the ends of the said ballways having an undulated radial configuration dimensioned to mate with the varying internal diameter radius of the housing with the outer diameters of said portions contacting the inner diameter of the housing to restrain the retainer against rotation within the housing, and means at the ends of said retainer restricting axial movement of the retainer within the housing.

3. The bearing of claim 2 wherein the said means includes radial grooves in the inner diameter of the housing adjacent the axial ends thereof and radially outturned flanges at the ends of the said retainer, the said flanges received in the said grooves.

4. The bearing of claim 2 wherein the said means includes grooves in the inner diameter of the said housing adjacent the axial ends thereof, and a snap ring received in said grooves having a radial wall abutting the axial ends of the retainer.

5. The bearing of claim 2 wherein the said means includes radial groove in the inner diameter of the said housing adjacent the axial ends thereof and spring fingers on the said retainer adjacent the axial ends thereof, the said spring fingers spring biased radially outwardly and having flange portions adapted to fit in the said grooves.

6. The bearing of claim 5 wherein the said spring fingers are formed integrally with the retainer.

7. In a linear motion bearing having a housing with a ball retainer received therein, the housing having a varying radius inner diameter, the improvement of the retainer having ball paths and having portions axially beyond the pathways adjacent either end thereof with a varying radius outer diameter indexing with the varying radius inner diameter of the housing to lock the retainer against rotation within the housing.

8. The improvement of claim 7 wherein the said retainer is a 360° substantially cylindrical tube.

9. A linear motion ball bearing comprising a housing with a varying inner diameter, said inner diameter defining radially innermost bearing loading lands circumferentially spaced by increased radius ball return portions, a ball retainer in said housing, said ball retainer comprising a substantially circular member having oval pathways formed therein circumferentially spaced from one another, the major axis of said oval pathways extending axially of the retainer, said pathways having loaded ball paths and unloaded ball paths, said loaded ball paths radially aligned with the said ball loading lands, the said unloaded ball paths radially aligned with the said ball return passageways, portions of the said retainer having a varying outer diameter interfitting with the varying inner diameter of the said housing to prevent rotation of the retainer with respect to the housing, the said varying diameter portions of the said retainer comprising axially separated portions extending axially beyond the ends of the pathways having an undulated radial configuration dimensioned to mate with the varying internal diameter radius of the housing with the said diameters of the said portions contacting the inner diameter of the housing, the remainder of the retainer being substantially tubular except for said pathways.

* * * * *